US011884207B2

(12) United States Patent
Lindberg Nilsson et al.

(10) Patent No.: US 11,884,207 B2
(45) Date of Patent: Jan. 30, 2024

(54) METHOD AND ARRANGEMENT FOR LIGHT ADAPTATION OF A VEHICLE DRIVER WHEN EXITING A TUNNEL

(71) Applicant: Ningbo Geely Automobile Research & Development Co., Ltd., Ningbo (CN)

(72) Inventors: Erik Lindberg Nilsson, Gothenburg (SE); Magnus Nilsson, Floda (SE)

(73) Assignee: NINGBO GEELY AUTOMOBILE RESEARCH & DEV. CO., LTD., Ningbo (CN)

(*) Notice: Subject to any disclaimer, the term of this patent is extended or adjusted under 35 U.S.C. 154(b) by 0 days.

(21) Appl. No.: 17/739,133

(22) Filed: May 8, 2022

(65) Prior Publication Data
US 2022/0258665 A1 Aug. 18, 2022

Related U.S. Application Data

(63) Continuation of application No. PCT/CN2020/122567, filed on Oct. 21, 2020.

(30) Foreign Application Priority Data

Nov. 13, 2019 (EP) ..................... 19208900

(51) Int. Cl.
*B60Q 3/72* (2017.01)
*B60Q 3/18* (2017.01)

(52) U.S. Cl.
CPC ......... *B60Q 3/72* (2017.02); *B60Q 3/18* (2017.02)

(58) Field of Classification Search
CPC ..................... B60Q 3/72; B60Q 3/18
See application file for complete search history.

(56) References Cited

U.S. PATENT DOCUMENTS

| 2,484,796 | A | 10/1949 | Ackerman |
| 2005/0240317 | A1 | 10/2005 | Kienzle-Lietl |

FOREIGN PATENT DOCUMENTS

| CN | 105188198 A | 12/2015 |
| CN | 107797549 A | 3/2018 |
| CN | 109131045 A | 1/2019 |
| CN | 110356313 A | 10/2019 |
| DE | 102008043601 A1 | 5/2010 |
| DE | 102012017276 A1 | 3/2014 |
| DE | 102014012758 A1 | 3/2016 |
| FR | 2875453 A1 | 3/2006 |
| FR | 3040350 A1 | 3/2017 |
| GB | 2475870 A | 6/2011 |
| JP | 2007125985 A | 5/2007 |
| JP | 2019066658 A | 4/2019 |
| KR | 101735068 B1 | 5/2017 |

OTHER PUBLICATIONS

International Search Report from corresponding International Application No. PCT/CN2020/122567, dated Jan. 27, 2021, 2 pages.
Massimo Bertozzi, et al., "Fast Vision-Based Road Tunnel Detection," ICIAP 2011, Part II, LNCS 6979, pp. 424-433, Springer-Verlag Berlin Heidelberg, 2011.

*Primary Examiner* — Joseph L Williams
(74) *Attorney, Agent, or Firm* — Tucker Ellis LLP

(57) ABSTRACT

A method and an arrangement for light adaptation of the eyes of a driver of a vehicle when exiting a tunnel. The method and arrangement determines a tunnel exit position and changes a light source luminous flux of at least one light source in the vehicle as the vehicle approaches the tunnel exit position in response to the determination of the tunnel exit position.

12 Claims, 5 Drawing Sheets

METHOD AND ARRANGEMENT FOR LIGHT ADAPTATION OF A VEHICLE DRIVER WHEN EXITING A TUNNEL

RELATED APPLICATION DATA

This application is a continuation of International Patent Application No. PCT/CN2020/122567, filed Oct. 21, 2020, which claims the benefit of European Patent Application No. 19208900.1, filed Nov. 13, 2019, the disclosures of which are incorporated herein by reference in their entireties.

TECHNICAL FIELD

The disclosure relates to a method and an arrangement for light adaptation of the eyes of a driver of a vehicle when exiting a tunnel.

BACKGROUND

When moving from a place that is poorly lit to a well-lit place, the human eyes need some time to adapt to the new light condition. This is called light adaptation and usually takes place over a few seconds. However, during those seconds, it can be difficult to see and if this happens during a driving situation, accidents can be caused due to the driver being unable to see for instance bends in the road. This situation is common when exiting a tunnel where some tunnels are poorly lit or not lit at all and a driver having adapted to the darker condition inside the tunnel is suddenly exposed to daylight. This can cause temporary blindness of the driver.

GB 2475870 A discloses a method for window shading for a motor vehicle, determining how much shading is required based on information provided from camera-and navigation systems. Adaptive shading requires a separate device attached to the windscreen or a windscreen that can be adapted over an area or over the entire windscreen. These alternatives requires retrofitting or replacement of the windscreen for existing vehicles or installation of non-standard components in new vehicles. This makes this method an expensive method to address the problem.

There is thus a need for an improved light adaptation method when exiting a tunnel.

SUMMARY

An objective of the disclosure is to provide a method and an arrangement for light adaptation of the eyes when exiting a tunnel.

The disclosure relates to a method for light adaptation of the eyes of a driver of a vehicle when exiting a tunnel, wherein the method comprises:
  determining a tunnel exit position, and
  changing a light source luminous flux of at least one light source in the vehicle as the vehicle approaches the tunnel exit position in response to the determination of the tunnel exit position.

As an alternative to an in-vehicle solution, a grating may be present at the end of the tunnel, letting some sunlight in before the tunnel exit. The grating can be installed in order to let drivers get a few seconds to acclimatize to sunlight again, thereby reducing the risk of the drivers being blinded.

However, it may not always be possible to include such a grating in a new tunnel, much less retrofit an existing tunnel with a grating. Adding light to the passenger compartment at the right time can have the same effect as the grating. By adding the light adaptation to the vehicle, it can be used for all tunnels, regardless of the lighting condition inside the tunnel and if there is a grating present or not. The method of the disclosure reduces the risk of accidents due to drivers being blinded when exiting tunnels. This adaptation can be made in all modern cars having internal light sources where the luminous flux of the light sources can be adjusted gradually. For vehicles that do not have a built-in software for the method according to the disclosure, a software upgrade can be installed enabling the method, making use of the vehicle's internal light sources. Alternatively, one or more additional lights may be installed and connected to the vehicle's software.

The method determines the tunnel exit, and in response to a determination of the tunnel exit position, at least one light source inside the vehicle changes its luminous flux as the vehicle approaches the tunnel exit. The gradual increase of the luminous flux assists the driver with the light adaptation and the driver's light adaptation is enough to greatly reduce or even completely eliminate the driver's temporary blindness when reaching the tunnel exit.

The method may further comprise:
  upon determining the tunnel exit position:
  determining a tunnel exit time for the vehicle to reach the tunnel exit position, and
  determining a light adaptation time,
  if the tunnel exit time is equal to or shorter than the light adaptation time,
  changing the light source luminous flux of the at least one light source in the vehicle as the vehicle approaches the tunnel exit position during the tunnel exit time.

Based on the distance from the tunnel exit, once the tunnel exit position is determined, and the speed of the vehicle, a tunnel exit time required for the vehicle to reach the tunnel exit position can be determined. Based on the light condition inside the vehicle and/or the amount of time spent inside the tunnel, a light adaptation time can be determined. The light adaptation time is the time that the eye requires to adapt to the light conditions at the tunnel exit. This time is normally measured in seconds and can be measured physiologically.

If it is determined that the tunnel exit time is equal to or shorter than the light adaptation time, the light source luminous flux of the at least one light source in the vehicle is changed as the vehicle approaches the tunnel exit position during the tunnel exit time.

The method may further comprise:
  if the tunnel exit time is equal to or shorter than the light adaptation time,
  increasing the light source luminous flux of the at least one light source in the vehicle as the vehicle approaches the tunnel exit position during the tunnel exit time.

In order to assist with the adaptation of the eye to the luminous flux at the tunnel exit position, the light source luminous flux is increased during the tunnel exit time as the vehicle approaches the tunnel exit position.

The method may further comprise:
  increasing the light source luminous flux of the at least one light source in a gradual manner from a first luminous flux to a second luminous flux, where the second luminous flux is higher than the first luminous flux.

In order to have a smooth transition between levels of luminous flux, and to make the light adaptation comfortable, the increase between levels of luminous flux is made in a gradual manner. The increase can be continuous or discontinuous.

The method may further comprise:
determining a luminous flux at the tunnel exit position, based on the determined luminous flux at the tunnel exit position,
determining a rate of change of luminous flux of the vehicle's internal light source.

In order to find a rate of change of the luminous flux of the vehicle's interior light source, the luminous flux at the tunnel exit position is determined. The luminous flux at the tunnel exit position changes for instance depending on the time of day or the weather. When this luminous flux is known, the rate of change of the luminous flux of the vehicle's interior lights source that is required to match the luminous flux at the tunnel exit can be determined.

The method may further comprise:
determining the light adaptation time from an average time of light adaptation or by detecting a pupil area and a rate of change of the pupil area by an eye-tracking sensor.

The method may take advantage of an average time of light adaptation known from physiological studies, or an eye-tracking sensor can be used to determine the pupil area of the driver to determine the amount of dark adaptation that has taken place inside the tunnel. Based on the pupil area, the light adaptation time can be determined. By knowing the luminous flux at the tunnel exit position, the determination of the light adaptation time can be made more accurately, but it is not necessary to use this information for determining the light adaptation time.

The method may further comprise:
adapting the rate of change in light source luminous flux of the at least one light source in the vehicle during the light adaptation time, if the speed of the vehicle changes during the light adaptation time.

The method may allow for changes in speed of the vehicle such that the tunnel exit time changes. In response to such a change, the rate of change in light source luminous flux of the at least one light source in the vehicle during the light adaptation time is adapted.

The method may further comprise:
determining a tunnel transition position and a tunnel transition time between the tunnel transition position and the tunnel exit position,
reducing the light source luminous flux of the at least one light source in the vehicle during the tunnel transition time.

During a period when the vehicle is close to the tunnel exit, i.e. during a tunnel transition time, outside light may enter the vehicle, adding to the total amount of light in the vehicle. In order for the total amount of light in the vehicle to not be blinding, the light source luminous flux of the at least one light source in the vehicle during the tunnel transition time is reduced. The tunnel transition time is determined by determining a tunnel transition position and calculating the distance between the tunnel transition position and the tunnel exit position. The speed of the vehicle determines the tunnel transition time.

The method may further comprise:
determining the tunnel exit by means of dead reckoning and an initial position of a tunnel entry from a geographic information system (GIS) or by detection of the tunnel exit by a tunnel exit sensor unit.

In order to determine the position of the tunnel exit, various methods may be used. As one alternative, an initial position of a tunnel entry from a geographic information system (GIS) can be retrieved and by using dead reckoning inside the tunnel, it can be determined when the vehicle approaches the tunnel exit, as this is also known. As a further alternative, detection of the tunnel exit can be made by a tunnel exit sensor unit, such as a forward-looking camera or a radar sensor.

The at least one light source may be arranged to emit light of various colour and/or colour temperatures. The method may in this case further comprise:
determining an input colour and/or colour temperature at the tunnel exit by a colour temperature sensor unit,
adapting at least one output colour and/or colour temperature of the at least one light source in the vehicle in response to the determination of the input colour and/or colour temperature.

In order to further improve the light adaptation, the method may take advantage of that at least one light source is arranged to emit light of different colour and/or colour temperatures. A colour temperature sensor unit determines the colour and/or colour temperature at the tunnel exit and using this as input, the method adapts the colour and/or colour temperature of the at least one light source to match the colour and/or colour temperature of the tunnel exit in order to provide the driver with a light condition that corresponds to the light condition at the tunnel exit. This makes the light adaptation even easier.

The disclosure also relates to a light adaptation arrangement for a vehicle, wherein the arrangement comprises at least one light source arranged to be connected to an electronic control unit arranged in the vehicle. The electronic control unit is configured for determining a tunnel exit position, and for changing a light source luminous flux of at least one light source in the vehicle as the vehicle approaches the tunnel exit position in response to the determination of the tunnel exit position.

The electronic control unit may be configured for determining a tunnel exit time for the vehicle to reach the tunnel exit position upon determining the tunnel exit position, for determining a light adaptation time and, if the tunnel exit time is equal to or shorter than the light adaptation time, for changing the light source luminous flux of the at least one light source in the vehicle as the vehicle approaches the tunnel exit position during the tunnel exit time.

The arrangement may comprise an eye-tracking sensor and the control unit may be configured for determining the light adaptation time from an average time of light adaptation or by detecting a pupil area and a rate of change of the pupil area by the eye-tracking sensor.

The control unit may be configured for determining a tunnel transition position and a tunnel transition time between the tunnel transition position and the tunnel exit position and for reducing the light source luminous flux of the at least one light source in the vehicle during the tunnel transition time.

The arrangement may comprise a colour temperature sensor unit, the at least one light source may be arranged to emit light of various colour and/or colour temperatures and the control unit may be configured for determining an input colour and/or colour temperature at the tunnel exit by a colour temperature sensor unit and for adapting at least one output colour and/or colour temperature of the at least one light source in the vehicle in response to the determination of the input colour and/or colour temperature.

The arrangement provides the same advantages as described above for the method.

The disclosure also relates to a vehicle comprising an arrangement according to the above description.

DETAILED DESCRIPTION

Figure 1A:
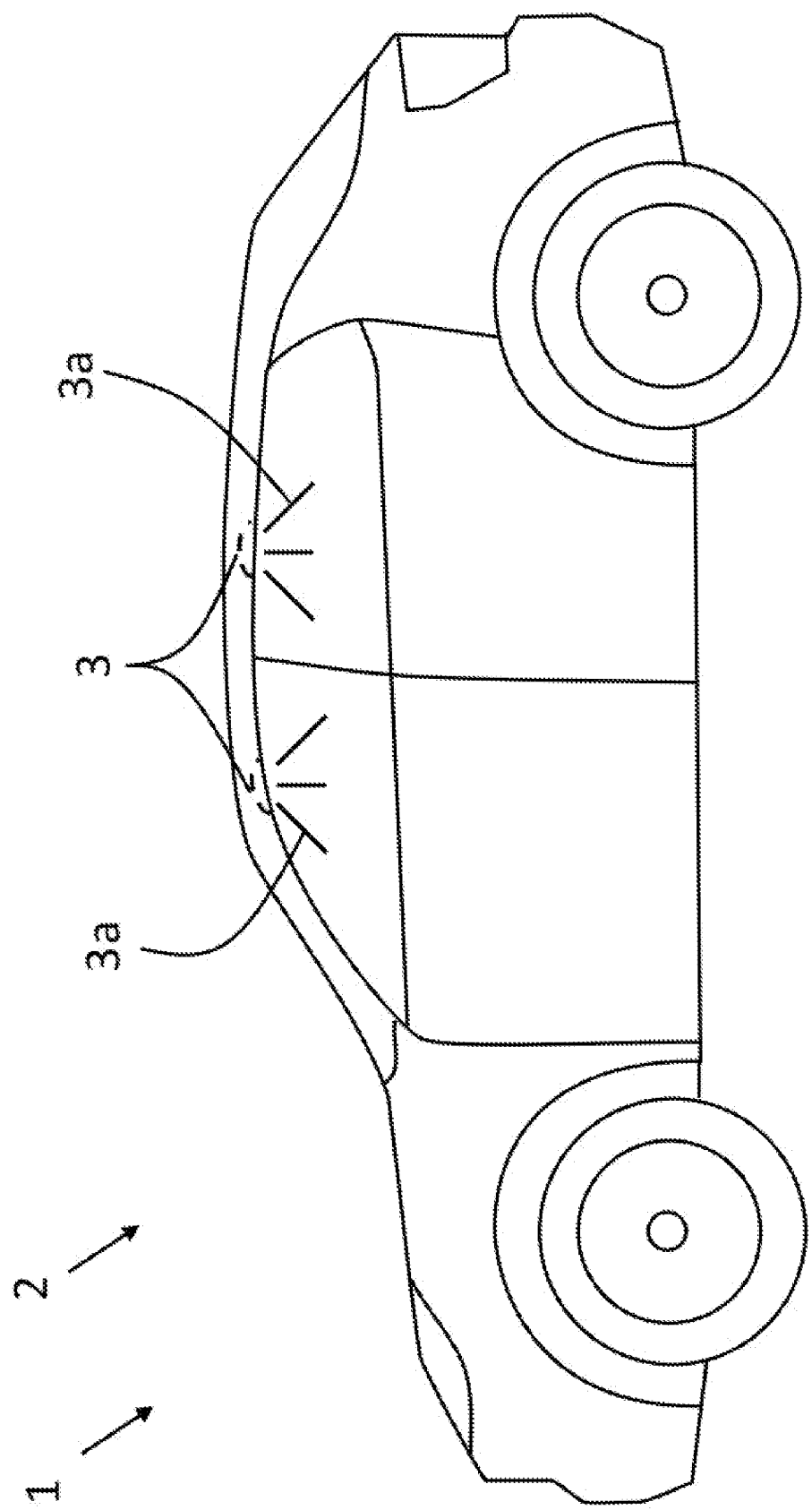
FIG. 1A schematically shows a vehicle comprising an arrangement according to the disclosure with at least one light source having a first luminous flux, FIG. 1B schematically shows a vehicle comprising an arrangement according to the disclosure with at least one light source having a second luminous flux in response to the vehicle approaching the tunnel exit position, FIG. 2 schematically shows determination of a tunnel exit time for the vehicle to reach the tunnel exit position and a chart illustrating light intensity and the increase of luminous flux inside the vehicle during the tunnel exit time, FIG. 3 schematically shows a chart illustrating determination of a tunnel transition position and a tunnel transition time between the tunnel transition position and the tunnel exit position, FIG. 4 schematically shows the interior of a vehicle with light sources surrounding the windscreen.

FIG. 1A schematically shows a vehicle 1 comprising an arrangement 2 according to the disclosure. The vehicle 1 comprises at least one light source 3 arranged to be connected to an electronic control unit (not shown) arranged in the vehicle 1. The electronic control unit is configured for determining a tunnel exit position, and for changing a light source luminous flux of at least one light source 3 in the vehicle 1 as the vehicle 1 approaches the tunnel exit position, in response to the determination of the tunnel exit position. The at least one light source 3 is arranged to change its luminous flux at least between a first luminous flux and a second luminous flux in a gradual manner. The luminous flux can be increased for instance linearly, exponentially or antilogarithmically, continuously or discontinuously.

Figure 1B:
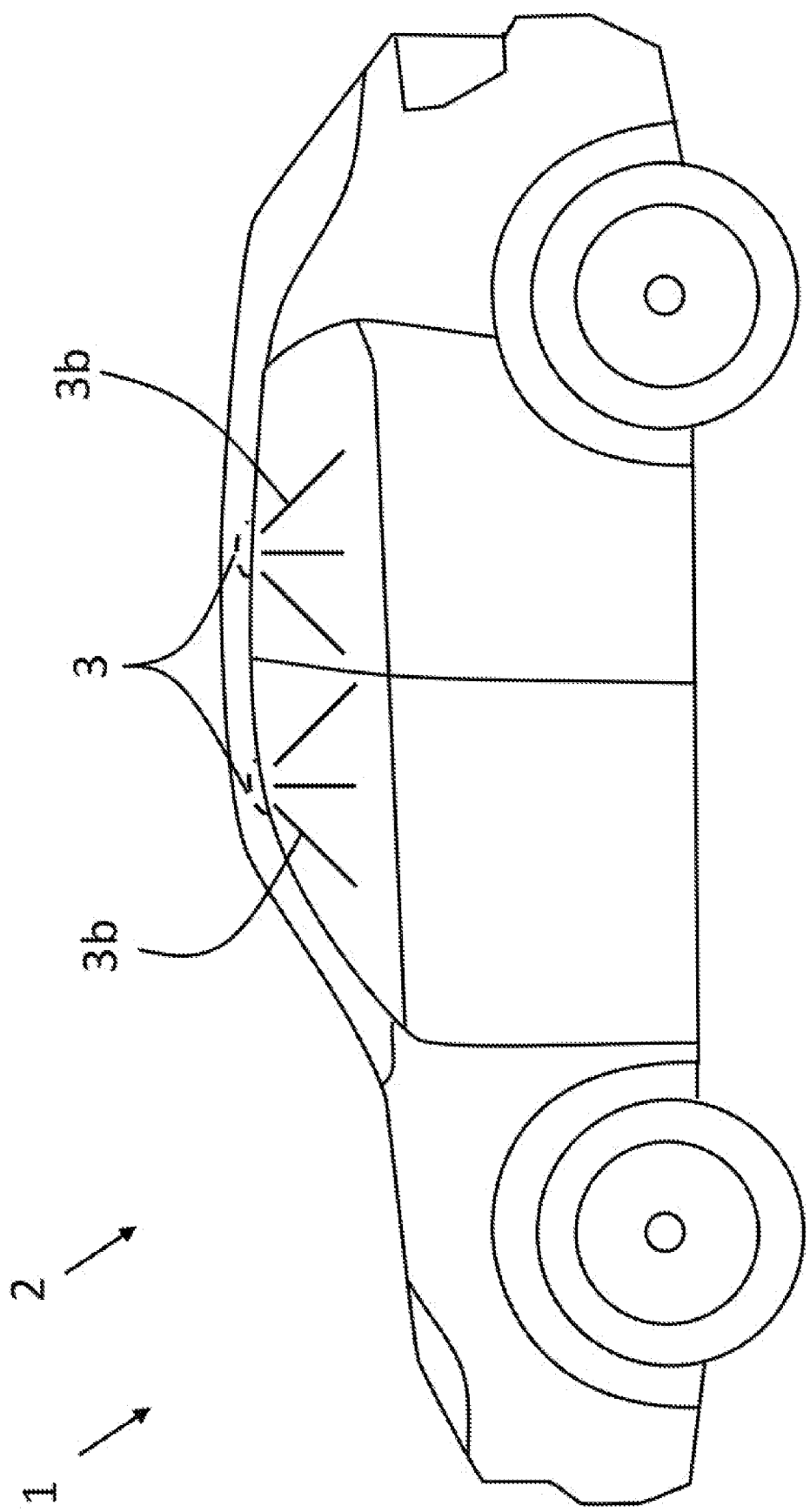

In FIGS. 1A and 1B, the vehicle's 1 internal lights are used as light sources 3 arranged to change their luminous flux to illustrate the method. In the example described in conjunction to FIGS. 1A and 1B, the vehicle's 1 internal ceiling lights, or dome lights or courtesy lights, are used. It is also possible within the scope of the disclosure to use other light sources inside the vehicle 1 such as for instance dashboard lights, seat lights, footwell lights or door lights, or to install additional light sources, for instance one or more light sources surrounding a windscreen of the vehicle 1. These light sources 3 can be directed in a suitable way to provide a comfortable light condition for a driver during light adaptation. Preferably, but not necessarily, the at least one light source 3 should emit soft, non-blinding light and should not cause reflection in any of the vehicle's 1 windows or the windscreen.

In FIG. 1A, the light sources 3 provide a first luminous flux, illustrating a start of the light adaptation method as the vehicle 1 approaches a tunnel exit. The first luminous flux is low as indicated by short light rays 3a emitted from the light source 3.

FIG. 1B schematically shows a vehicle 1 comprising an arrangement 2 according to the disclosure with at least one light source 3 having a second luminous flux in response to the vehicle 1 approaching the tunnel exit position. In FIG. 1B, the light source 3 provides a second luminous flux, higher than the first luminous flux. This is indicated by longer rays 3b in FIG. 1B emitted from the light source 3. The situation in FIG. 1B illustrates a position of the vehicle 1 close to the tunnel exit when the light condition inside the vehicle 1 is close to or equal to the light condition at the tunnel exit, i.e. when light adaptation is essentially complete.

Figure 2:
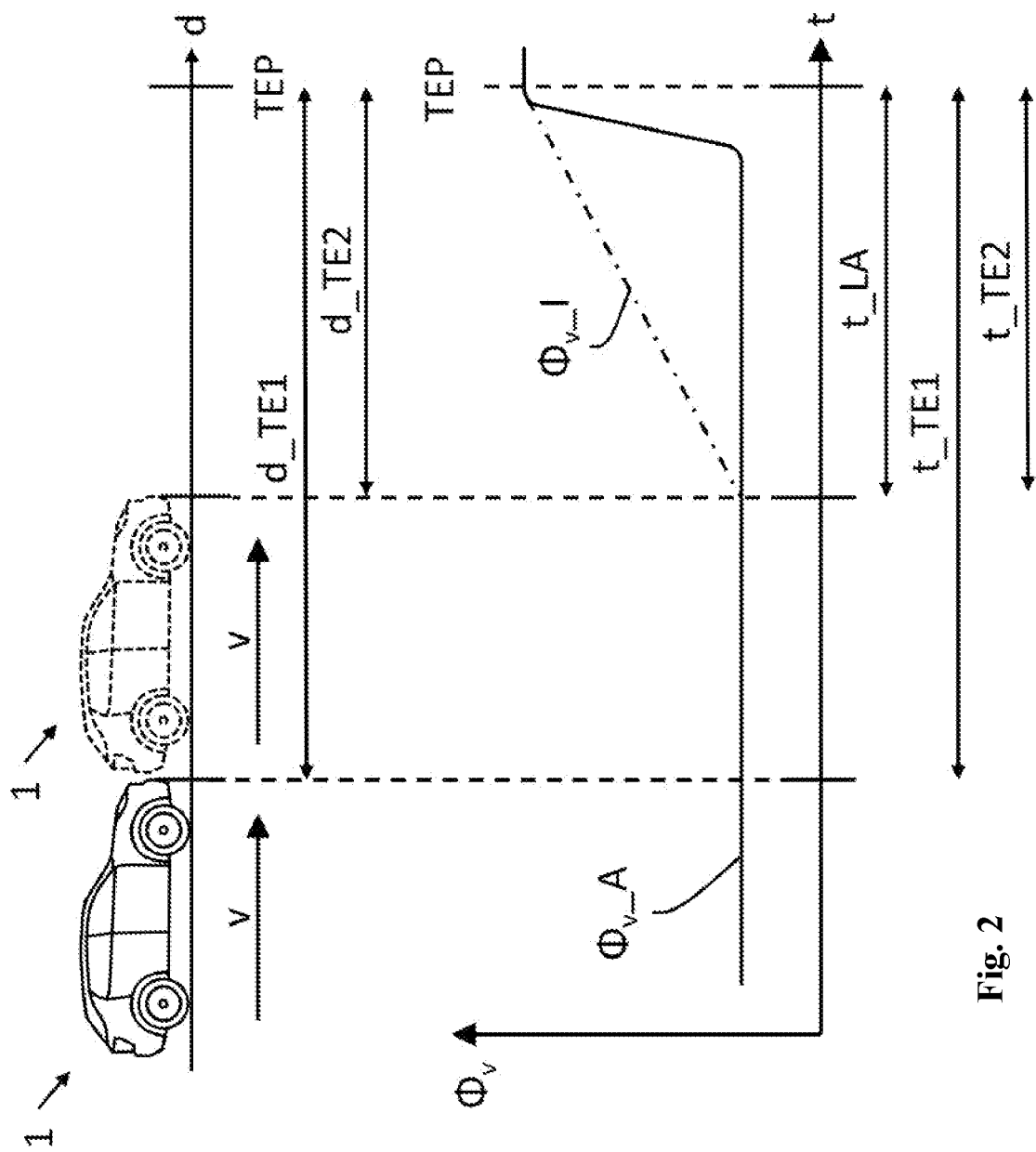

FIG. 2 schematically shows determination of a tunnel exit time t_TE for the vehicle 1 to reach a tunnel exit position TEP and a chart illustrating luminous flux $\Phi_v$ inside the vehicle 1 and the increase of luminous flux $\Phi_v$ inside the vehicle 1 during the tunnel exit time t_TE. In the upper part of FIG. 2, the vehicle 1 is in a first position illustrated by the vehicle 1 having solid lines, and is travelling inside a tunnel (not shown) with a speed v towards the tunnel exit position TEP. At a given moment, the vehicle 1 is at a first tunnel exit distance d_TE1 relative the tunnel exit position TEP. By using the equation d=vt, where d is the distance, v is the speed and t is the time, a first tunnel exit time t_TE1 can be calculated as t_TE1=d_TE1/v. The tunnel exit position TEP is known from for instance dead reckoning and an initial position of a tunnel entry from a geographic information system (GIS) or from detection of the tunnel exit by a tunnel exit sensor unit. This will be described in more detail below.

At a later time, the vehicle 1 is in a second position as illustrated by the vehicle 1 in dashed lines, still travelling at a speed v, at a second tunnel exit distance d_TE2. A second tunnel exit time t_TE2 can be calculated as t_TE2=d_TE2/v similar to the above calculation for t_TE1.

The solid line in the chart of FIG. 2 is the luminous flux inside the vehicle 1 resulting from the ambient light, $\Phi_v\_A$, while the dash-dot line is the luminous flux inside the vehicle 1 emanating from the at least one light source 3 inside the vehicle, $\Phi_v\_I$. As illustrated in FIG. 2, as the ambient light inside the tunnel may be low, but not necessarily zero, the luminous flux $\Phi_v\_A$ resulting from ambient light is low inside the vehicle 1.

The total luminous flux inside the vehicle 1 is essentially the sum of the luminous flux inside the vehicle 1 resulting from the ambient light in the tunnel, $\Phi_v\_A$, and the luminous flux inside the vehicle 1 emanating from the at least one light source 3 inside the vehicle, $\Phi_v\_I$. The total luminous flux inside the vehicle 1 is not shown in FIG. 2.

The first tunnel exit time t_TE1 in the chart of FIG. 2 is intended to correspond to the first tunnel exit distance d_TE1 in the upper part of FIG. 2, as illustrated by the dashed vertical line connecting the chart and the upper part of FIG. 2. As can be seen in FIG. 2, the first tunnel exit time t_TE1 is longer than a light adaption time t_LA and thus, no increase in luminous flux from the vehicle's internal light source $\Phi_v\_I$ is yet needed as the vehicle 1 is still too far away from the tunnel exit position TEP for light adaptation to be meaningful.

As the vehicle 1 approaches the tunnel exit position TEP, the tunnel exit distance d_TE and thereby the tunnel exit time t_TE decreases. At the second position, the second tunnel exit time t_TE2, corresponding to a second tunnel exit distance d_TE2, becomes essentially equal to a light adaptation time t_LA. When the second tunnel exit time t_TE2 becomes essentially equal to the light adaptation time t_LA, the luminous flux $\Phi_v\_I$ of the at least one light source 3 inside the vehicle 1 increases, as can be seen from the chart. In the example of FIG. 2, the luminous flux $\Phi_v\_I$ from the light source 3 inside the vehicle 1 increases from a level essentially equal to the luminous flux level $\Phi_v\_A$ resulting from the ambient light inside the tunnel. It is also possible to have the luminous flux $\Phi_v\_I$ from the light source 3 inside the vehicle 1 increase from a lower or higher luminous flux than the luminous flux resulting from the ambient light inside the tunnel $\Phi_v\_A$. The starting luminous flux $\Phi_v\_I$ from the light source 3 inside the vehicle 1 may, in a further example, be zero. The luminous flux $\Phi_v\_I$ from the light source 3 inside the vehicle 1 increases until the vehicle 1 reaches the tunnel exit position TEP, where it is turned off. In FIG. 2, the luminous flux resulting from the ambient light $\Phi_v\_A$ extends past the tunnel exit position TEP, thus the exact location where the light source 3 is turned off is not seen.

In FIG. 2 it is assumed that the vehicle 1 travels at a constant speed v. It is of course likely that the speed changes at least slightly during the distance travelled inside the tunnel. As the time for light adjustment t_LA is known and a fixed time, and the tunnel exit position TEP is known at a fixed location, the second tunnel exit distance d_TE2 corresponding to a second tunnel exit time t_TE2 when the second tunnel exit time t_TE2 is equal to the light adaptation time t_LA needs to be dependent on the speed v in order for optimal light adaptation. This can be seen from the equation $$t\_LA = t\_TE2 = d\_TE2/v$$

If v increases and t_TE2 is fixed, the second tunnel exit distance d_TE2 when the luminous flux $\Phi_v\_I$ starts to increase is made longer in order for the second tunnel exit time t_TE2 to continue to be equal to the light adaptation time t_LA. Similarly, if v decreases and t_TE2 is fixed, the second tunnel exit distance d_TE2 when the luminous flux $\Phi_v\_I$ starts to increase is made shorter in order for the second tunnel exit time t_TE2 to continue to be equal to the light adaptation time t_LA. This is continuously adjusted in the vehicle's 1 electronic controls.

The rate of the increase of luminous flux $\Phi_v\_I$ from the internal light source 3 is determined from for instance an average time of light adaptation depending on the time spent in the tunnel or from detection of a pupil area and a rate of change of the pupil area by an eye-tracking sensor. The average time of light adaptation can be found from physiological measurements and can be taken as is or made more specific based on the time spent in the tunnel and/or the luminous flux from ambient light in the tunnel. This is for instance implemented as look-up tables in the vehicle's 1 control system. Alternatively or supplementary to the use of average time of light adaptation, when entering the tunnel, the eye-tracking sensor can detect both the actual pupil area and the rate of change of the pupil area as the eye adapts to the darker light condition inside the tunnel. These parameters are used to determine how much the eye has adapted to the darker light condition and thereby how much the eye needs to be readapted to a brighter light condition. By using an eye-tracking sensor, the light adaptation time t_LA can be continuously updated as the light condition inside the tunnel may vary between different tunnel sections.

Additional parameters that can change the second tunnel exit distance d_TE2 and thereby the second tunnel exit time t_TE2 is the rate of increase of luminous flux $\Phi_v\_I$ from the vehicle's internal light source 3 as described above and the final luminous flux that has to be reached in order to match the ambient luminous flux outside of the tunnel.

Figure 3:
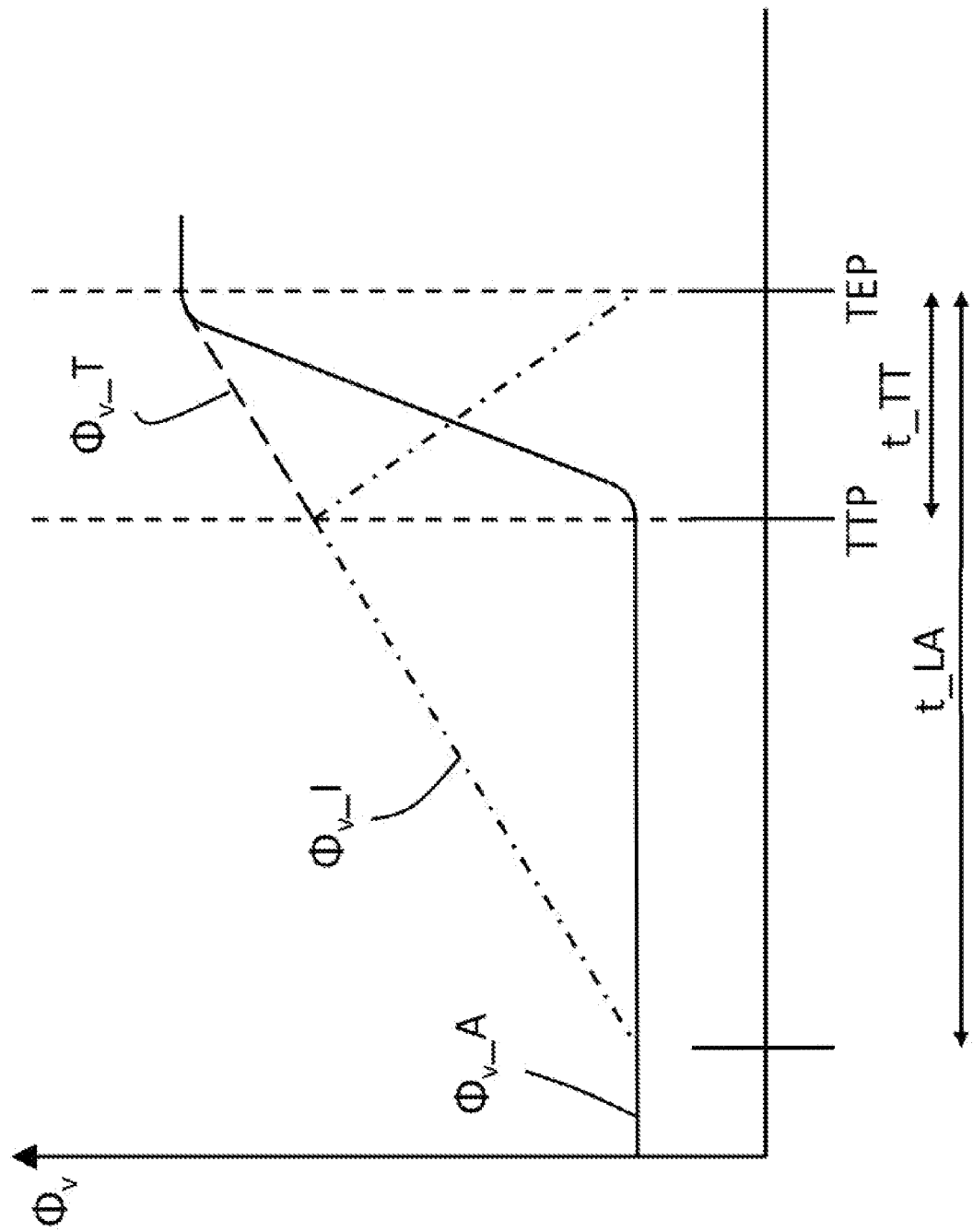

FIG. 3 schematically shows a chart illustrating determination of a tunnel transition position TTP and a tunnel transition time t_TT between the tunnel transition position TTP and the tunnel exit position TEP. In order to reduce the risk of saturating the driver's eyes and have a light condition inside the vehicle 1 that will blind the driver during an end part of the tunnel just before exiting the tunnel, a tunnel transition time t_TT can be determined by knowing a tunnel transition distance d_TT. The tunnel transition distance d_TT is the distance between the tunnel transition position TTP and the tunnel exit position TEP.

Depending on the light condition near the tunnel exit position TEP, the luminous flux $\Phi_v\_I$ of the vehicle's light source 3 may be decreased to obtain a total combined luminous flux $\Phi_v\_T$ from the vehicle's light source 3 and the ambient light at the tunnel exit. As indicated in FIG. 3, the luminous flux of the vehicle's internal light source $\Phi_v\_I$, increases until a tunnel transition position TTP is reached. At this position, the luminous flux inside the vehicle 1 resulting from the ambient light $\Phi_v\_A$ reaches a threshold value. Between the tunnel transition position TTP and the tunnel exit position TEP, ambient light from outside of the tunnel increases. After passing the tunnel transition position TTP the luminous flux of the vehicle's light source $\Phi_v\_I$ starts to decrease to ensure that the total luminous flux $\Phi_v\_T$ does not cause blinding. The total luminous flux $\Phi_v\_T$ is indicated by the dashed line during the tunnel transition time t_TT and is essentially the sum of the luminous flux $\Phi_v\_I$ of the vehicle's internal light source 3 and the luminous flux $\Phi_v\_A$ of the ambient light inside the tunnel during the tunnel transition time t_TT. The total luminous flux $\Phi_v\_T$ is omitted from the first part of the chart of FIG. 3 for clarity.

The times and shapes of the luminous fluxes in the chart in FIG. 3 are for illustrative purposes only and should not be seen as limiting. The increase and decrease of the luminous flux $\Phi_v\_I$ of the vehicle's internal light source 3 does not have to be linear, it can also be increased and decreased for instance exponentially or antilogarithmically. The increase can also be continuous, as shown in FIG. 3, or discontinuous where discrete incremental increases and decreases of the luminous flux $\Phi_v\_I$ of the vehicle's internal light source 3 take place. Any combination of the above-mentioned ways to increase and decrease the luminous flux $\Phi_v\_I$ of the vehicle's internal light source 3 is possible. This also applies to the description of FIG. 2.

There are numerous ways to determine the ambient luminous flux at the tunnel exit in order to determine the rate of increase of luminous flux of the vehicle's internal light source 3 and the light adaptation time and thereby the second tunnel exit time t_TE2 and second tunnel exit distance d_TE2. One alternative would be to use a known vehicle sensor that measures the ambient luminous flux before the vehicle 1 enters the tunnel. A further alternative would be to use a forward-looking camera arranged on the vehicle 1, measuring the luminous flux at the tunnel exit. A further alternative would be to install a sensor at the tunnel exit that measures the luminous flux at the sensor position and thereby at the tunnel exit. This measurement is transmitted to every vehicle entering the tunnel. A further alternative would be to receive data transmitted from oncoming traffic having entered the tunnel from the opposite side. These vehicles have measured the luminous flux at the outside of the tunnel. This measurement can be transmitted to oncoming vehicles they meet in the tunnel or after having exited the tunnel. Measurements from other vehicles travelling in the same direction as the present vehicle, having exited the tunnel, can also be received and used to determine the necessary parameters for the method. As a further alternative, luminous flux measurements can be transmitted to a cloud service, which thereafter can be accessed by a vehicle approaching a tunnel.

The location of the tunnel transition position TTP can be measured in the same way as described above for the determining the ambient luminous flux at the tunnel exit. An additional way to determine the tunnel transition position is to have a luminous flux meter inside the vehicle 1 that determines when a threshold luminous flux inside the vehicle 1 is reached and the luminous flux of the vehicle's internal light source 3 thereby starts to be reduced. The threshold luminous flux can for instance be set to be a percentage of the luminous flux inside the vehicle 1 resulting from the tunnel's ambient light. In one example, the threshold luminous flux can be between 20-40% more than the luminous flux inside the vehicle 1 resulting from a measurement period from when the vehicle 1 has entered the tunnel. For instance, the luminous flux meter inside the vehicle 1 registers a luminous flux resulting from the tunnel's ambient light during a period of time. This will be used as the threshold luminous flux. When the luminous flux meter thereafter registers a luminous flux inside the vehicle that is greater than the threshold luminous flux, the vehicle's internal light source 3 thereby starts to reduce their luminous flux.

In the examples of FIGS. 2 and 3, the light source luminous flux of the at least one light source 3 in the vehicle 1 starts to change at the point in the tunnel where the tunnel exit time t_TE equals the light adaptation time t_LA. It is conceivable within the scope of the disclosure to have the light source luminous flux of the at least one light source 3 in the vehicle 1 start to change at a time, and thereby a distance, shorter than the light adaptation time t_LA. This will result in that total light adaptation will not be achieved by the tunnel exit position, but the driver will see the end of the tunnel in greater detail due to the incomplete light adaptation.

In the instances where the at least one light source 3 is arranged to emit light of various colour and/or colour temperatures, an input colour and/or colour temperature at the tunnel exit can be determined by a colour temperature sensor unit and at least one output colour and/or colour temperature of the at least one light source 3 in the vehicle 1 can be adapted in response to the determination of the input colour and/or colour temperature. For determining the colour and/or colour temperature at the tunnel exit, a forward-looking camera can be focused on the tunnel exit. If the camera can detect the colour and/or colour temperature of the tunnel exit despite the tunnel exit being bright, the light source 3 is desaturated and the final colour and/or colour temperature of the light source 3 is reached at the tunnel exit. If the camera is overexposed, i.e. the tunnel exit is too bright to determine the colour and/or colour temperature, one image with the exposure adjusted to overcome the overexposure is taken in order to determine the colour and/or colour temperature. The exposure setting of the camera is thereafter reset to the exposure setting to determine the tunnel exit position TEP.

One method to determine the tunnel exit position TEP is described in Fast Vision-Based Road Tunnel Detection, M. Bertozzi Et. al, G. Maino and G. L. Foresti (Eds.): ICIAP 2011, Part II, LNCS 6979, pp. 424-433, Springer-Verlag Berlin Heidelberg 2011.

Determination of the tunnel exit by means of dead reckoning and an initial position of a tunnel entry from a geographic information system (GIS) can alternatively be used. This technique is well known and will not be described further. Other alternative ways to determine the tunnel exit position TEP also lie within the scope of the described method and arrangement.

Figure 4:
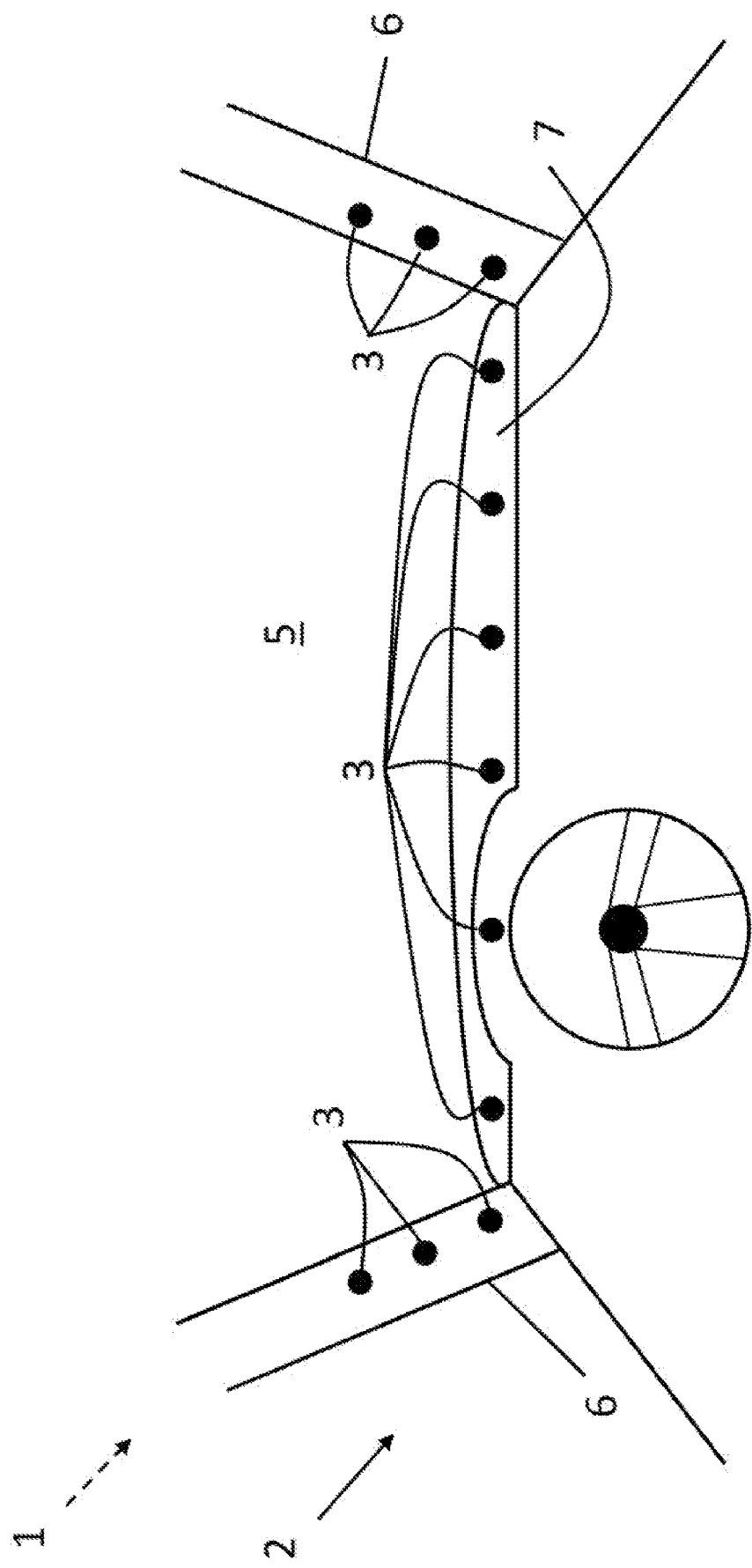

FIG. 4 schematically shows the interior of a vehicle 1 with light sources 3 surrounding the windscreen 5. As an alternative to using the already present ceiling lights in the vehicle's interior, an arrangement 2 according to the disclosure can benefit from installing light sources 3 surrounding the windscreen 5. In the example described in FIG. 4, the light sources are installed on the vehicle's A pillars 6 and on various locations on the dashboard 7. As indicated above, the light sources 3 can also be installed for instance in, on or under a seat, in footwells or in doors. These light sources 3 preferably emit diffuse light or are equipped with a material that causes the light emitted to be diffuse in order to not blind the driver. The light sources 3 in the arrangement 2 in FIG. 4 are light emitting diodes (LEDs) or other light sources that can emit light with varying colour and/or colour temperatures.

Although the disclosure has been illustrated and described in detail in the drawings and foregoing description, such illustration and description are to be considered illustrative or exemplary and the disclosure is not limited to the disclosed example embodiments.

What is claimed is:

1. A method for light adaptation of the eyes of a driver of a vehicle when exiting a tunnel, wherein the method comprises:
   determining a tunnel exit position, and
   changing a light source luminous flux of at least one light source in the vehicle as the vehicle approaches the tunnel exit position in response to the determination of the tunnel exit position;
   upon determining the tunnel exit position:
   determining a tunnel exit time for the vehicle to reach the tunnel exit position, and
   determining a light adaptation time,
   if the tunnel exit time is equal to or shorter than the light adaptation time,
   changing the light source luminous flux of the at least one light source in the vehicle as the vehicle approaches the tunnel exit position during the tunnel exit time, and
   wherein the at least one light source is configured to emit light of various colors and/or emit light of various color temperatures, the method further comprises:
   determining at least one of a color or a color temperature of light at the tunnel exit position,
   matching a color and/or a color temperature of light emitted by the at least one light source in the vehicle to the determined at least one of color or color temperature of light at the tunnel exit position.

2. The method according to claim 1, wherein the method comprises:
   if the tunnel exit time is equal to or shorter than the light adaptation time,
   increasing the light source luminous flux of the at least one light source in the vehicle as the vehicle approaches the tunnel exit position during the tunnel exit time.

3. The method according to claim 2, wherein the method comprises:
   increasing the light source luminous flux of the at least one light source in a gradual manner from a first luminous flux to a second luminous flux, where the second luminous flux is higher than the first luminous flux.

4. The method according to claim 3, wherein the method comprises:
   adapting the rate of change in light source luminous flux of the at least one light source in the vehicle during the light adaptation time, if the speed of the vehicle changes during the light adaptation time.

5. The method according to claim 1, wherein the method comprises:
   determining a luminous flux at the tunnel exit position, based on the determined luminous flux at the tunnel exit position, determining a rate of change of luminous flux of the vehicle's internal light source.

6. The method according to claim 1, wherein the method comprises:
determining the light adaptation time from an average time of light adaptation or by detecting a pupil area and a rate of change of the pupil area by an eye-tracking sensor.

7. The method according to claim 1, wherein the method comprises:
determining a tunnel transition position and a tunnel transition time between the tunnel transition position and the tunnel exit position,
reducing the light source luminous flux of the at least one light source in the vehicle during the tunnel transition time.

8. The method according to claim 1, wherein the method comprises:
determining the tunnel exit position by means of dead reckoning and an initial position of a tunnel entry from a geographic information system or by detection of the tunnel exit position by a tunnel exit sensor unit.

9. A light adaptation arrangement for a vehicle, wherein the arrangement comprises:
at least one light source arranged in the vehicle and configured to emit light of various colors and/or emit light of various color temperatures; and
an electronic control unit arranged in the vehicle and connected to control the at least one light source,
wherein the electronic control unit is configured to determine tunnel exit position, and for changing a light source luminous flux of at least one light source in the vehicle as the vehicle approaches the tunnel exit position in response to the determination of the tunnel exit position;
wherein the electronic control unit is configured to determine tunnel exit time for the vehicle to reach the tunnel exit position upon determining the tunnel exit position, and for determining a light adaptation time and, if the tunnel exit time is equal to or shorter than the light adaptation time, for changing the light source luminous flux of the at least one light source in the vehicle as the vehicle approaches the tunnel exit position during the tunnel exit time; and
wherein the electronic control unit is configured to determine at least one of a color or a color temperature of light at the tunnel exit position and control a color and/or a color temperature of light emitted by the at least one light source in the vehicle to match the determined at least one of light color or color temperature of light at the tunnel exit position.

10. The light adaptation arrangement according to claim 9, wherein the arrangement comprises an eye-tracking sensor and the control unit is configured for determining the light adaptation time from an average time of light adaptation or by detecting a pupil area and a rate of change of the pupil area by the eye-tracking sensor.

11. The light adaptation arrangement according to claim 9, wherein the control unit is configured for determining a tunnel transition position and a tunnel transition time between the tunnel transition position and the tunnel exit position and for reducing the light source luminous flux of the at least one light source in the vehicle during the tunnel transition time.

12. A vehicle comprising the arrangement according to claim 9.

* * * * *